A. ZWYSSIG.
CHANGE SPEED GEAR.
APPLICATION FILED OCT. 21, 1921.

1,426,700.

Patented Aug. 22, 1922.

Inventor:
Adolf Zwyssig
by
His attorney

UNITED STATES PATENT OFFICE.

ADOLF ZWYSSIG, OF SISIKON, SWITZERLAND.

CHANGE-SPEED GEAR.

1,426,700.  Specification of Letters Patent.  Patented Aug. 22, 1922.

Application filed October 21, 1921. Serial No. 509,328.

*To all whom it may concern:*

Be it known that I, ADOLF ZWYSSIG, a citizen of the Swiss Confederation, residing at Sisikon, Switzerland, have invented certain new and useful Improvements in Change-Speed Gears, of which the following is a specification.

The gear wheels in change speed gear boxes are at present operated by hand with the aid of a lever. On roads where there is much traffic the conductor of the car must use one hand for the steering and the other for the manipulation of the signal so that the transmission can be attended to only when one of the two other manipulations is neglected.

This invention has for its object a device for the operation of the transmission gear wheels in the change speed gear box, specially for motor cars, according to which the transmission wheels are operated by pedals.

With this object in view several rock levers, having each two arms, are arranged in juxtaposition upon a rod, one arm of said levers being each connected with one transmission wheel, the other arms of the levers being adapted to be swung, with the aid of a pedal which is mounted upon a second rod so that it can be oscillated and shifted in axial direction, the transmission being thrown in gear by the simultaneous movement of the other arm.

In order that the invention may be clearly understood, I shall proceed to describe the same with reference to the form of construction shown by way of example on the accompanying drawing, wherein:—

Figure 2:
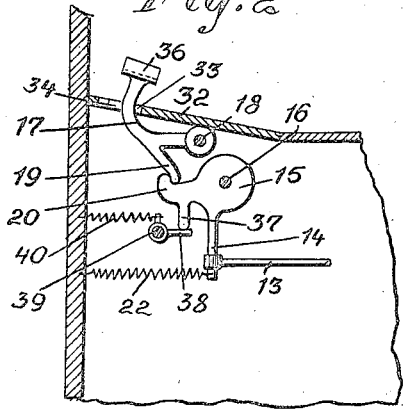
Fig. 2 shows on a larger scale in elevation, partly in section, a constructional detail.
Figure 3:
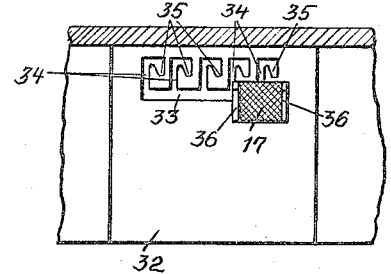
Fig. 3 is a plan view of Fig. 2.

The driving shaft 2 and the transmission shaft 3 are revolubly mounted in the box 1 of the change speed gear. Upon the outer free end of shaft 2 the toothed wheel 4 is keyed which is in gear with a toothed wheel of the engine shaft not shown on the drawing. Upon the outer free end of the transmission shaft 3 a bevel gear wheel 5 is keyed adapted for engagement with the conventional Cardan gear mechanism not shown here. The four change speed gear wheels 6 of different diameters are fixed upon the transmission shaft 3. Four similar toothed wheels 7 are mounted upon the driving shaft 2 by means of a key and feather arrangement 23, so that they can be reciprocated on the shaft in longitudinal direction but are held against relative rotary displacement. The gear wheels 7 which are intended to be alternately thrown into mesh with the corresponding toothed wheels 6 have each a cylindrical, circumferentially grooved hub extension 8. Straps 9 rectangularly rigidly extending from the connecting rods 11 loosely engage in these hub grooves. The connecting rods 11 are movable in longitudinal direction and are guided in fixed supports 12. Each connecting rod 13 is hinged at one end to the outer end of a rod 11 and at the other end is rigidly connected to the depending arm 14 (Fig. 2) of the corresponding rock lever 15. The several rock levers 15 are all pivotally mounted upon a rod 18, and a pedal lever 17 is pivotally mounted on a rod 18 with capability of relative longitudinal displacement.

Figure 1:
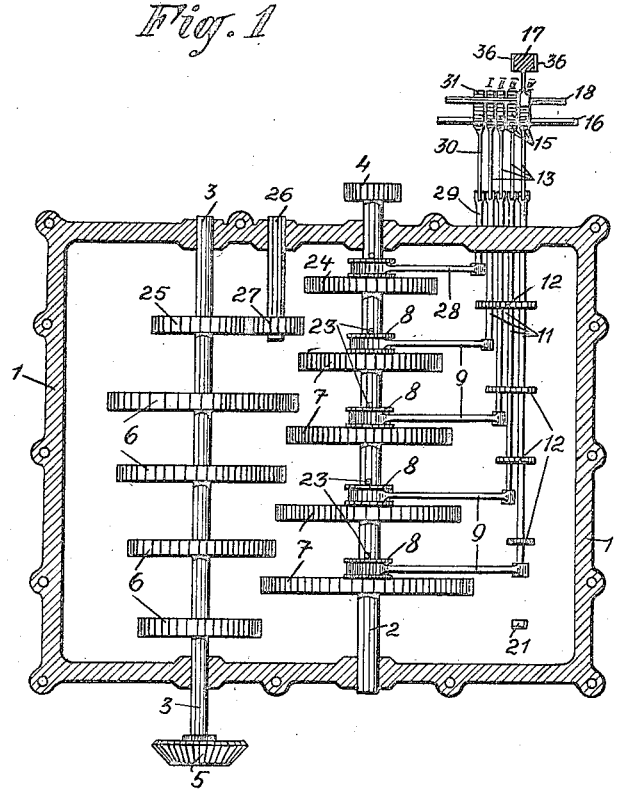
Fig. 1 is a plan view of the change speed gear, the box being shown in section.

Upon the pedal lever 17 being actuated by foot pressure in a downward direction, the depending extension 19 of this pedal lever will act on the arm 20 of that rock lever 15 (lever unit IV in Fig. 1) over which said pedal lever has been shifted for the time being, which causes the lever 15 to rock with the result that by means of the rods 13 and 11 the corresponding toothed wheel 7 of shaft 2, in this instance that of the largest diameter, is moved into engagement with the corresponding toothed wheel 6 on shaft 3, in this instance the wheel of the smallest diameter, so that now the high gear is thrown in. As soon as the operated toothed wheel 7 meshes with the facing toothed wheel 6 the respective control rod 11 (of lever units I, II and III) is stopped by the respective support 12 and in the case of the control rod 11 of the unit IV by the stop 21 whereby the parts are arrested. The arms 20 of the levers 15 are each controlled by a spring 22 so that these arms and the toothed wheels 7 have always the tendency to return to the initial position as soon as the pedal is released. Upon the driving shaft 2 there are further mounted stop pins 23 with which the cylindrical extensions 8 of the toothed wheels come in contact when they are being returned to their initial position through the action of the spiral springs 22. A fifth toothed wheel 24 is mounted upon the driving shaft 2 and a fifth toothed wheel 25 is mounted upon the transmission shaft 3 between which a transmission pinion 27 is arranged which is revolubly mounted upon an axle 26 and serves for the backward drive of the car. The toothed wheel 24 has also a hub with an annular groove with which engages the arm 28 fixed to the control rod 29. To the outer end of this control rod 29 the steering rod 30 is hinged which is otherwise connected with the lever 31 similar to the levers 15. When said lever 31 is depressed by means of the pedal 17 the wheel 24 is thrown in gear.

The upper arm of the pedal lever 17 is guided in a longitudinal slot 33 of a guide plate 32 so that it can be laterally displaced. Transverse slots 34 branching off from said longitudinal slot 33 terminate in notches 35. The distance between the transverse slots 34 corresponds with the distance between the levers 15.

To operate the change speed gear the pedal lever 17 has to be shifted so that it stands in front of the transverse slot 34 which corresponds with the lever of the change wheel which has to be thrown in gear. The pedal lever is then pushed into the transverse slot 34 and depressed and brought in engagement with the corresponding notch 35 by a slight lateral displacement so that it cannot get out accidentally.

The foot plate or pedal 36 has lateral upwardly bent flanges 36. For this foot plate a stirrup could be substituted.

The levers 15 have each a downwardly projecting nipple 37 adapted to act upon the flap 38 which is keyed upon a revoluble shaft 39 connected by connecting rod not shown on the drawing with the throttle of the carburettor. When one of the transmission wheels 7 is caused to mesh with the corresponding wheel 6 by depression of the pedal the depending finger 37 of the rock lever 15 depresses the lever arm 38, which is positively connected to the carburettor throttle which latter is thereby correspondingly opened. The lever arm 38 or its shaft 39 is controlled by a drawspring 40, which tends to normally retain the lever arm 38 in the position in which the carburettor valve is closed. Upon disconnecting a set of gears the finger 37 returns to the normal position thereby releasing the lever 38 which then under the action of the spring 40 returns into the position in which the gas supply is cut off. In this manner the fuel supply is always shut off as long as there is no transmission gear thrown in.

The lever arm 38 could evidently be operated also by a hand rod or by means of a separate pedal not shown on the drawing.

I claim:—

1. An improved device for the operation of change speed gear, specially for motor cars comprising in combination with the box of the change speed gear and with the driving shaft upon which the change wheels are loosely mounted so that they can be displaced in longitudinal direction and with the transmission shaft, the transmission wheels keyed upon the same, a two-armed rock lever for each change wheel, an articulated lever system connecting the lower arm of this lever with the corresponding change wheel, a cover plate over said two-armed levers having a longitudinal slot and transverse slots, one for each lever, a pedal lever loosely mounted upon a horizontal rod and projecting with its upper end through said longitudinal slot so that it can be brought over any one of said two-armed levers and a lower arm of said pedal lever adapted to act upon the corresponding two-armed lever when said pedal lever is being depressed so that the two-armed lever is oscillated and throws the corresponding change wheel in gear with its transmission wheel.

2. An improved device for the operation of change speed gear, specially for motor cars comprising in combination with the box of the change speed gear and with the driving shaft upon which the change wheels are loosely mounted so that they can be displaced in longitudinal direction, a projecting hub of each change wheel having an annular groove and with the transmission shaft the transmission wheels keyed upon the same, a two-armed lever for each change wheel, an articulated lever system connecting the lower arm of this lever with the corresponding change wheel and engaging with the said annular groove of the hub of its change wheel, a cover plate over said two-armed levers having a longitudinal slot and transverse slots, one for each lever, a pedal lever loosely mounted upon a horizontal rod and projecting with its upper end through said longitudinal slot so that it can be brought over any of said two-armed levers and a lower arm of said pedal lever adapted to act upon the corresponding two-armed lever when said pedal lever is being depressed so that the two-armed lever is oscillated and throws the corresponding change wheel in gear with its transmission wheel.

3. An improved device for the operation of change speed gear, specially for motor cars comprising in combination with the box of the change speed gear and with the driving shaft upon which the change wheels are loosely mounted so that they can be displaced in longitudinal direction and with the transmission shaft with the transmission wheels keyed upon the same, a two-armed lever for each change wheel, a spring for maintaining said two-armed lever in the normal position, an articulated lever system connecting the lower arm of this lever with the corresponding change wheel, a cover plate over said two-armed levers having a longitudinal slot and transverse slots, one for each lever, a pedal lever loosely mounted upon a horizontal rod and projecting with its upper end through said longitudinal slot so that it can be brought over any one of said two-armed levers, and a lower arm of said pedal lever adapted to act upon the corresponding two-armed lever when said pedal lever is being depressed so that the two-armed lever is oscillated and throws the corresponding change wheel in gear with its transmission wheel.

4. An improved device for the operation of change speed gear, specially for motor cars comprising in combination with the box of the change speed gear and with the driving shaft upon which the change wheels are loosely mounted so that they can be displaced in longitudinal direction and with the transmission shaft with the transmission wheels keyed upon the same, a two-armed lever for each change wheel, a spring for maintaining said two-armed lever in the normal position, an articulated lever system connecting the lower arm of this lever with the corresponding change wheel, a cover plate over said two-armed levers having a longitudinal slot and transverse slots, one for each lever, a pedal lever loosely mounted upon a horizontal rod and projecting with its upper end through said longitudinal slot so that it can be brought over any one of said two-armed levers, a lower arm of said pedal lever adapted to act upon the corresponding two-armed lever when said pedal lever is being depressed so that the two-armed lever is oscillated and throws the corresponding change wheel in gear with its transmission wheel, a depending finger on each of said two-armed levers, a lever arm positively controlling the throttle valve of the carburettor, and said fingers adapted to cooperate with said carburettor-controlling lever arm when one of said two-armed levers is rocked, and means for returning said carburettor-controlling arm into the inoperative position upon return of the respectively operated two-armed lever into its normal position of rest.

In testimony whereof I affix my signature.

ADOLF ZWYSSIG.